(12) United States Patent
Kosarev

(10) Patent No.: US 8,873,826 B2
(45) Date of Patent: *Oct. 28, 2014

(54) METHOD FOR BRIGHTNESS LEVEL CALCULATION OF THE DIGITAL X-RAY IMAGE FOR MEDICAL APPLICATIONS

(71) Applicant: IMPUL'S Zakrytoe akcionernoe obschestvo, Sankt-Petersburg (RU)

(72) Inventor: Ruslan Nikolaevich Kosarev, Kingisepp (RU)

(73) Assignee: Zakrytoe akcionernoe obshchestvo "Impul's", Sankt-Petersburg (RU)

( * ) Notice: Subject to any disclaimer, the term of this patent is extended or adjusted under 35 U.S.C. 154(b) by 0 days.

This patent is subject to a terminal disclaimer.

(21) Appl. No.: 13/850,385

(22) Filed: Mar. 26, 2013

(65) Prior Publication Data

US 2013/0230229 A1 Sep. 5, 2013

Related U.S. Application Data

(63) Continuation of application No. 13/239,824, filed on Sep. 22, 2011, now Pat. No. 8,433,121, which is a continuation of application No. PCT/RU2010/000611, filed on Oct. 21, 2010.

(30) Foreign Application Priority Data

Mar. 31, 2010 (RU) .................. 2010112306

(51) Int. Cl.
  *G06K 9/00* (2006.01)
  *G06K 9/62* (2006.01)
  *G06T 7/40* (2006.01)
  *B41M 5/00* (2006.01)

(52) U.S. Cl.
  CPC ..... *G06K 9/6232* (2013.01); *G06T 2207/30004* (2013.01); *G06T 2207/10116* (2013.01); *G06T 7/401* (2013.01); *G06T 2207/20084* (2013.01)
  USPC .......................................... 382/132; 378/28

(58) Field of Classification Search
  USPC ......... 382/100, 103, 107, 106, 128–134, 155, 382/162, 164, 168, 149, 173, 181, 209, 224, 382/232, 254, 274, 276, 305, 312; 378/21, 378/23, 28, 4; 705/2
  See application file for complete search history.

(56) References Cited

U.S. PATENT DOCUMENTS 6,269,179 B1 * 7/2001 Vachtsevanos et al. ....... 382/149
7,218,763 B2 * 5/2007 Belykh et al. ................. 382/128
(Continued)

FOREIGN PATENT DOCUMENTS

EP 0409206 B1 10/1997
WO 00/60908 A1 10/2000

OTHER PUBLICATIONS

International Search Report from PCT/RU2010/000611 filed Oct. 21, 2010, mailed Mar. 2, 2011.
Chang C-C et al.: "A Connectionist Approach for Thresholding", proceedings, 11th IAPR International Conference on Pattern Recognition, 1992.

(Continued)

*Primary Examiner* — Seyed Azarian
(74) *Attorney, Agent, or Firm* — Patentbar International, P.C.

(57) ABSTRACT

The invention relates to methods for evaluation a brightness level of the digital x-ray image for medical applications by means of the image histogram using a neural network. The calculations comprise of: image acquisition, image histogram calculation, transformation the frequencies of the histogram into input arguments of the neural network and calculation the brightness level as linear transform of the output value of the neural network. Training of the neural network is performed over a learning set calculated over the given image database. The transformed frequencies of histograms of these images are used as a set of input arguments of the neural network. The brightness levels calculated for each image over the region of interest and scaled to the range of output values of the neuron network are used as a set of target values.

4 Claims, 3 Drawing Sheets

(56) References Cited

U.S. PATENT DOCUMENTS

| | | | |
|---|---|---|---|
| 7,747,058 B2 * | 6/2010 | Spahn | 382/132 |
| 8,027,849 B2 * | 9/2011 | Johnson et al. | 705/2 |
| 8,311,850 B2 * | 11/2012 | Johnson et al. | 705/2 |
| 2006/0198552 A1 | 9/2006 | Spahn | |

OTHER PUBLICATIONS

Haykin, S.: "Neural networks: A comprehensive foundation" / Simon Haykin—2nd ed.—Delhi: Pearson Prentice Hall, 1999—842 p.

Gonzalez, R.C. et al.: "Digital Image Processing Using MATLAB" / Rafael C. Gonzalez, Richard E. Woods, Steven L. Eddins—New Jersey: Pearson Prentice Hall, 2004.

* cited by examiner

METHOD FOR BRIGHTNESS LEVEL CALCULATION OF THE DIGITAL X-RAY IMAGE FOR MEDICAL APPLICATIONS

RELATED APPLICATIONS

This application is a Continuation application of U.S. patent application Ser. No. 13/239,824, filed on Sep. 22, 2011, which is a Continuation application of International Application PCT/RU2010/000611 filed on Oct. 21, 2010, which in turn claims priority to Russian application No. RU2010112306 filed on Mar. 31, 2010, all of which are incorporated herein by reference in their entirety.

FIELD OF THE INVENTION

This invention relates to processing methods of digital x-ray images for medical applications, namely, to calculation of the brightness level of the digital x-ray image for medical applications.

BACKGROUND OF THE INVENTION

An x-ray image besides images of patient organs projections generally involves images of parts of a device (e.g. collimator) and air projections. A region of interest is usually meant as that part of an image where there is the image of patient organs projections only. The necessity to determine the brightness level correctly occurs for example in the following cases:

At digital image visualization on a display of the monitor

For exposure control during the acquisition of series of x-ray images.

The x-ray image visualization with the correct brightness and contrast levels contributes to better understanding the x-ray image and right diagnosing respectively. While acquiring series of sequential images knowing the brightness level corresponding to the region of interest in the previous image the digital detector exposure time can be correctly set to acquire the next image. Correctly chosen exposure allows acquiring x-ray images of considerable higher quality without dark and/or overexposed regions with optimal noise-to-signal ratio in the region of interest. The standard frequency of the x-ray image series is 30 frames per second, therefore it is extremely important to determine the brightness level fast enough to be able to adjust the exposure time and/or x-ray tube characteristics. It is also necessary that the brightness level calculation method be stable in course of calculations performed on series of sequential images.

The method [R. Gonzalez, R. Woods, S. Eddins. Digital Image Processing Using MATLAB (DIPUM). Technosphera, 2006, p. 32] for image brightness level determination is known. According to that method the brightness level is calculated as a mean value between the minimum and maximum brightness values $$Level = (Value_\alpha + Value_{1-\alpha})/2$$

$Value_\alpha$ is the $\alpha$-quantile of brightness of pixels over the image. Parameter $\alpha$ is to be chosen sufficiently small, not more than 0.01. This method does not provide necessary calculation accuracy of the brightness level in case of presence of air and/or collimator regions within the image.

The closest technical solution chosen as a prototype is the method for determination of the brightness level described in [Patent EP 0 409 206 B1, p. 6, published 01.10.1997,]. In accordance with the prototype the method comprises of reading out the digital image data into the main memory of the device and performing after that the following calculations:

The image histogram with the bin width equal to 1 is calculated.

The level A of brightness at which pixels of lower brightness considered the background once is calculated.

The histogram within the interval where pixel brightness is more than A is analyzed. The brightness MVP corresponding to the maximum histogram frequency in the said interval is calculated.

Initial values for image visualization is chosen: window level $WL_0 = MVP$ and the window width $WW_0 = 2 \times (MVP - A)$.

The parameter $\Delta WW = WW_0/2$ is calculated.

Using a neural net the quality index $\{Q_i\}_{i=0}^{8}$ is calculated for each pair of values $(WL_0 \pm \Delta WW, WW_0 \pm \Delta WW)$.

Using the hill climbing method, such a pair of values $(WL_c, WW_c)$ at which the quality index $Q_c$ has its maximum value is calculated. During an iterative procedure the parameter $\Delta WW$ is corrected.

The quality index is evaluated by means of a feedforward neural network, (hereinafter—neural network), having one hidden layer and one neural in the output layer with the sigmoid activation functions of neurons. The window level and window width $(WL_c, WW_c)$, correlating to the maximum value of the quality index $Q_c$, is considered optimal parameters for image visualization.

One or several images for which a skilled operator sets desirable values of the window level and window width (WLG,WWG) are used for training. Then a table consisting out of 25 values is made.

$$(WLG \pm \Delta WWG/2 \pm \Delta WWG/4, WWG \pm \Delta WWG/2 \pm \Delta WWG/4) \leftrightarrow Q_i, \Delta WWG = WWG/2;$$

$Q_i$—predetermined values of the quality index.

Input arguments of neural network (five or even more) are calculated for each pair) $(WL_i, WW_i)$. The quality index $Q_i$, correlating to the appropriate pair $(WL_i, WW_i)$, is used as a target value. So, marking desirable parameters of the window level and window width on the given image set an operator gets data for neural network training and after that trains it.

Disadvantages of the method according to the prototype are as follows:

Being applied to exposure control task when brightness level is only to be determined the method provides redundant information.

By means of the method the algorithm stability in course of calculation of series of imagers is not controlled. It is important for exposure control during the acquisition of series of imagers.

SUMMARY OF THE INVENTION

The technical result tends to determine the brightness level of the digital x-ray image for medical applications.

The technical result of the invention involving creation of the image database and training of the neural network, the transformed frequencies histogram of these images are used as input arguments of the neural network, the brightness levels calculated over the region of interest and scaled to the range of output values of the neuron network are used as target values of the neural network; is achieved, due to the operations, acquisition of the current digital x-ray medical image, calculation of the histogram of the image and transformation of the frequencies of histogram to the input arguments of the neuron network, calculation of the brightness level as linear function of the output value of the neural network.

As a neural network a feedforward neural network with one hidden layer and the sigmoid functions of neurons is used.

To calculate the target values to train a neural network, the brightness level of image of the database is calculated as a mean value of brightness of the pixels belonging to the region of interest.

The histogram is calculated over all pixels of the image.

The histogram is calculated over the pixels within the circle, the center of the circle coincides with the image center and the diameter of the circle is equal to the shortest side of the image.

The technical result of the invention under application consists of the calculation of the brightness level of the digital x-ray image for medical applications. At that, the method is stable in application to series of images. The supplementary technical result involves simplicity of the hardware and high performance algorithm.

The algorithm is based on the experimentally established fact that there is a statistical relationship between the image histogram and the brightness level.

The aspect of the method under application is as follows.

As input arguments of the neural network the transformed frequencies of histogram are used.

The brightness level is calculated as a linear function of the output value of the neural network.

Training of the neural network is performed using a learning set specified on the database of the selected x-ray images, the brightness levels calculated for each image over the region of interest and scaled to the range of the output values of the neural network are used as a set of target values.

In order to identify a statistical relationship between the histogram and the brightness level a feedforward neural network is used [Simon Haykin. Neural networks a Comprehensive Foundation., 2006, p. 55]. Now we are going to identify some general stages of method realization:

Selection of the digital x-ray images to database and classification of the images by type of the patient's organs.

Calculation of the learning set—a set of input arguments of the neural network and a set of target values to train a neural network.

Choosing the error function and the neural network training algorithm.

Training the set of neural networks of different architecture, number of input arguments, layers, and neurons.

Selection of the neural network with the least number of parameters and the best way suited to solve the problem.

The method essence is explained by means of the figures given below.

Error=100×(Level'/Level−1),

Level'—level of brightness acquired using the method under application;

Level—level of brightness calculated over the region of interest.

Figure 1:
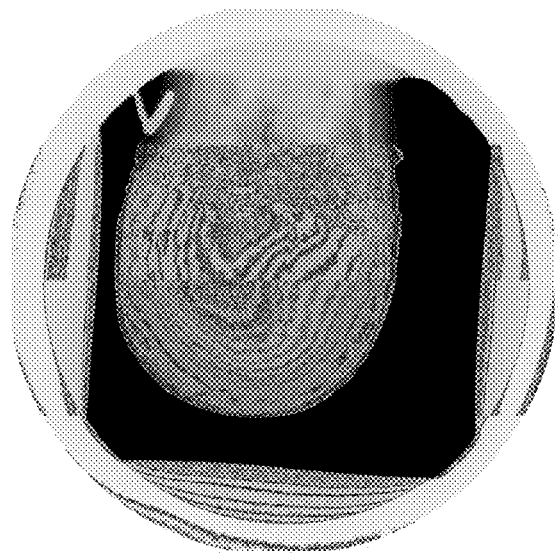
FIG. 1 Example of the digital x-ray image for medical applications acquired from one of the x-ray apparatuses.
Figure 2:
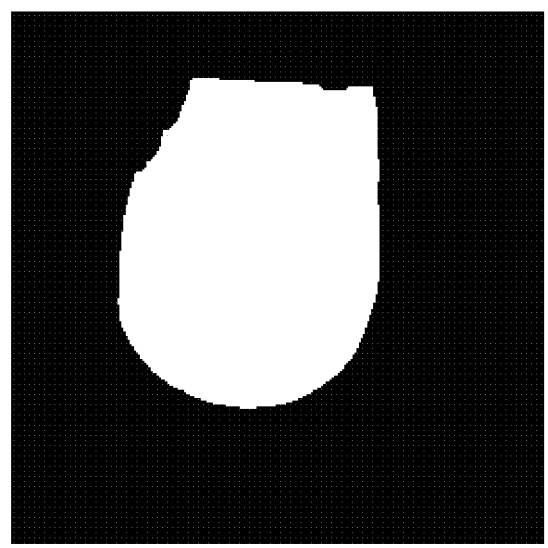
FIG. 2 Region of interest correlating to the image of FIG. 1.
Figure 3:
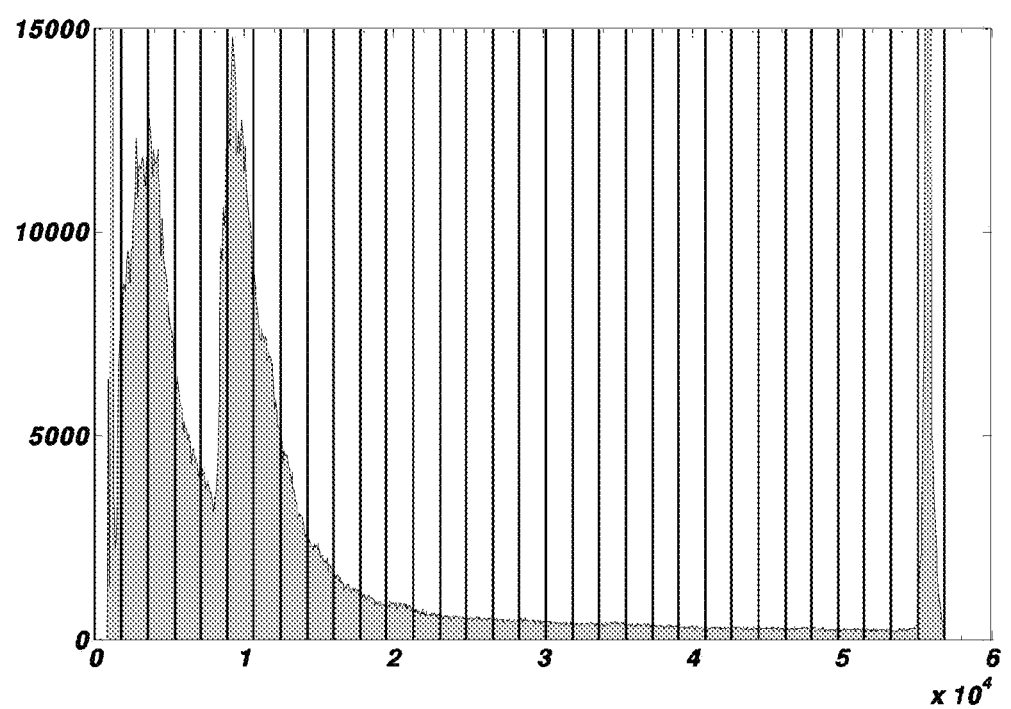
FIG. 3 Example of the histogram of 16 bit image. Gray scale is in horizontal direction, pixel number with the given brightness—in vertical direction. Vertical lines show interval subdividing [0, Bright] into 32 parts. The value Bright is α—quantile of image brightness with α=0.999.
Figure 4:
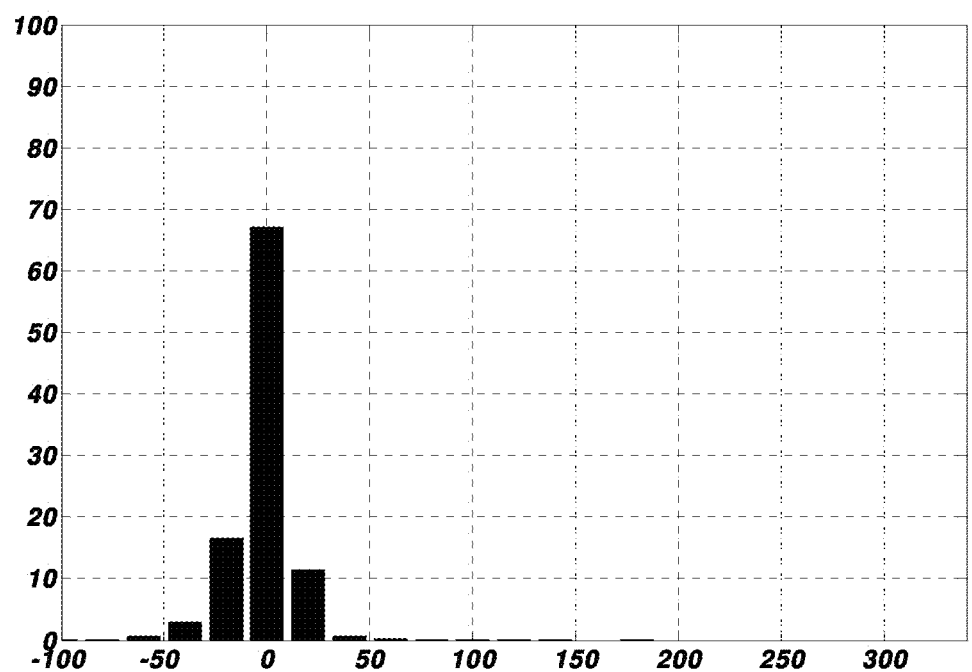
FIG. 4 Common histogram of a relative error for a learning sample
Figure 5:
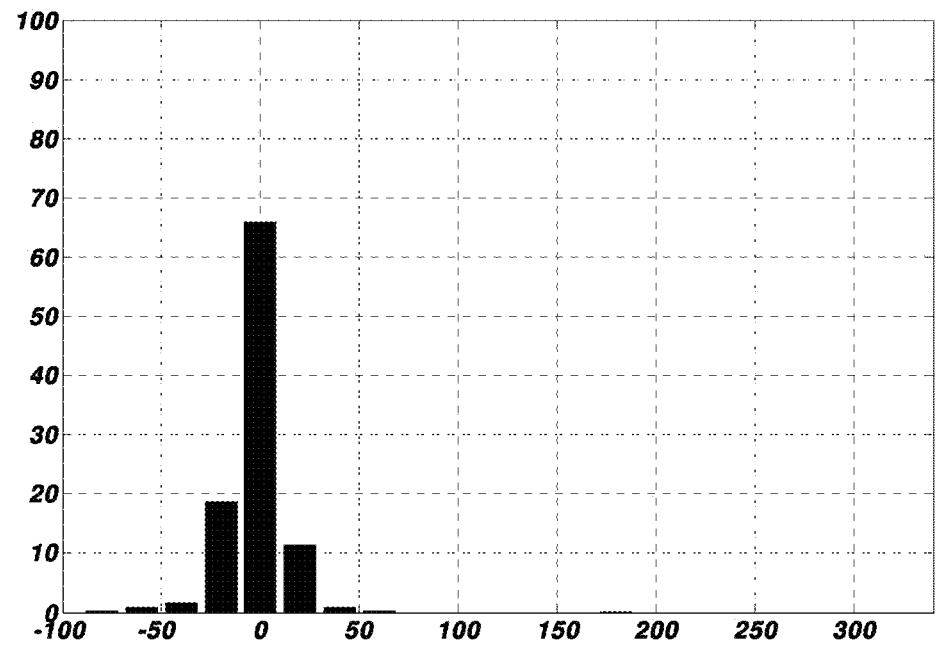

FIG. 5 Common histogram of a relative error for a test sample.

DETAILED DESCRIPTION OF THE PREFERRED EMBODIMENTS

Stage 1. Image database generation involves selection of preferred images and generating binary images with the region of interest for every image. Generating a binary image of the region of interest can be performed using specialized software or manually marking the region of interest by any standard image processor. At the first stage a database of the set of pairs {Image, ROI} is generated, where Image is the initial image and ROI is the image of the region of interest. In our case there was collected and processed about ten thousand of images.

Stage 2 involves design of learning set examples. For each pair {Image,ROI} the histogram Hist of the image, with bin width is equal to unity, and the brightness level Level in the region of interest are calculated. The brightness level Level is mean value over all pixels within the region of interest $$\text{Level} = \frac{1}{M} \sum_{k \in ROI} p_k$$

Level—brightness level;
$p_k$—brightness value of the pixel k;
M—number of pixels in the region of interest.

As a result for each pair {Image,ROI} a pair consisting of histogram and brightness level {Hist, Level} is acquired.

The histogram can be evaluated over the whole image as well as over the preliminary selected region. Usually, a patient is positioned in such a way that the image projection of organs be in the center of the digital detector. Therefore in the second variant histogram can be evaluated in the circle whose center coincides with the center of the image and its diameter is equal to the shortest side of the image.

Further for each pair {Hist, Level} input arguments Input and a target value Target shall be evaluated. Input arguments Input and target value Target shall satisfy the following requirements:

Pairs {Input, Target} shall be invariant relatively to multiplication of the image by a constant value.

Target values Target must belong to the range of the output values of the neuron network.

For histogram Hist the brightness interval [0, Bright] is calculated in such a way that upper limit Bright is a α-quantile of brightness of pixels. The interval [0, Bright] shall be divided by S equal intervals and Input, value is calculated as a sum of histogram $Hist_k$ values within the interval I, $$Input_i = \sum_{k \in I} Hist_k, \, i < S$$

$$Input_S = \sum_k Hist_k - \sum_{i=1}^{S-1} Input_i$$

$Input_i$—input argument with the index i;
$Hist_k$—value of the histogram Hist with the index k.

S is a number of input arguments of the neural network that is selected by means of numerical experiments together with parameter α. It is clear that input arguments $Input_i$ (i<S) are the frequencies of histogram calculated with the bin width Bright/S. Further, Target'=Level/Bright is calculated for each Level. In such a way obtained pairs {Input,Target'} are invariant relatively to multiplication of the image by a constant value.

As activation functions of neurons the sigmoid function is used $$f(x) = \frac{1}{1 + \exp(-x)},$$

It is clear the range of values is the interval [0,1], therefore the set of target values Target' should be scaled to this interval. For this purpose the linear transformation is used $$\text{Target} = \frac{\text{Target}' - \min\{\text{Target}'\}}{\max\{\text{Target}'\} - \min\{\text{Target}'\}}$$

Thus to calculate the level Level from the known output value Output of the neural network we have Level=Bright×($C_1$×Output+$C_2$)

$C_1$=max{Target'}−min{Target'};
$C_2$=min{Target'}.

Thus the brightness level is calculated as a linear function of the output value of the neural network.

Two variants are used as an error function of the neural network. The first variant is a mean-root-square error with regularization $$\text{Error} = \text{Ratio} \times \frac{1}{N} \sum_{i=1}^{N} (\text{Output}_i - \text{Target}_i)^2 + (1 - \text{Ratio}) \times \sum_{k} x_k^2$$

The second variant is a mean-root-square error having regularization $$\text{Error} = \text{Ratio} \times \sum_{i=1}^{N} W_i \times (\text{Output}_i - \text{Target}_i)^2 + (1 - \text{Ratio}) \times \sum_{k} x_k^2$$

Ratio—regularizing factor;
$W_i$—weight for the pair {Input, Target} with index i;
N—number of pairs in the training of the neural network;

$$\sum_{k} x_k^2$$

—sum of squares of all parameters of the neural network.

The first member in both expressions defines the accuracy of the training of the neural network, and the second one is regularizing member. Weights $W_i$ are calculated as $$W_i = \frac{1}{\text{Target}_i'^2} \bigg/ \sum_{i=1}^{N} \frac{1}{\text{Target}_i'^2},$$

i.e. the smaller weights $W_i$ correspond to pairs with bigger values $\text{Target}_i$.

To train the neural network a standard algorithm—conjugate gradient method with back propagation—is used [Moller, Neural Networks, vol. 6, 1993, p. 525]. Regularizing factor Ratio is established by the way to eliminate errors more than 0.5 percent while the image is rotated and the value Level is repeatedly calculated. In our case the regularizing factor Ratio is equal to the value 0.9999.

In order to avoid the overfitting problem it is used a standard approach when the set of learning examples {Input, Target} is divided into two parts. One of them is used to train the neural network, and the second one—to test the neural network. As we mentioned above after organization of the image database the classification of the images by type of patient's organs is performed. Then the set of learning examples is divided into two samples in the ratio 80 and 20 percent by the way to place 80 percent of images of each type into a learning sample, and remaining 20 percent—into a sample for testing.

Numeral experiments showed that to solve the given task it is possible to use a feedforward neural network with one hidden layer, from 30 to 60 of input arguments, and from 5 to 10 neurons in the hidden layer. Parameter α can be chosen from the range from 0.98 to 0.9999. In order to realize the claimed method in a specified device there was chosen a neural network with minimum number of parameters other conditions being equal.

The preferable variant of the invention implementation is the method to evaluate the brightness level of the digital x-ray image for medical applications that involves an image acquisition, image histogram calculation, transformation of the frequencies of histogram into input arguments of the neural network and the brightness level calculation using neural network.

The transformed frequencies of histogram are used as input arguments of the neural network. The brightness level is calculated as a linear function of the output value of the neural network.

Neural network learning is performed using a learning set calculated on the image database; as a set of target values the brightness levels calculated for each image over the region of interest and scaled to the range of the output values of the neural network are used.

As a neural network a feedforward neural network with one hidden layer and the sigmoid activation functions of neurons is used.

The brightness level is calculated as a mean value of pixel brightness belonging to the region of interest.

The histogram is calculated over the pixels within the circle, the center of the circle coincides with the image center and the diameter of the circle is equal to the shortest side of the image.

INDUSTRIAL APPLICABILITY

Known numerical methods of data processing and analyzing are used in the method under application. Also known hardware and devices are used to acquire said data.

What is claimed is:
1. A method for determining brightness of a medical digital X-ray image comprising:
creating an image database;
training a feedforward neural network with one hidden layer and sigmoid functions of neurons;
using transformed frequencies of image histograms as input arguments for the neural network;

using brightness values calculated over a region of interest and scaled to an output value range of the neuron network as target values for the neural network training;

acquisition of a current medical digital X-ray image;

calculation of a histogram of the current image;

transformation of histogram frequencies into input arguments for the neuron network; and calculation of the brightness as a linear function of an output value of the neural network.

2. The method according to claim 1, wherein, for calculation of the target values for the neural network training, the brightness of an image in the image database is calculated as a mean brightness of pixels within the region of interest.

3. The method according to claim 1, wherein the histogram is calculated over all pixels of the current image.

4. The method according to claim 1, wherein the histogram is calculated over pixels within a circle centered at a center of the current image and having a diameter equal to a shortest dimension of the current image.

* * * * *